No. 796,638. PATENTED AUG. 8, 1905.
F. J. HALL.
MOLDING DEVICE.
APPLICATION FILED JAN. 20, 1905.

WITNESSES:
Geo. D. Richards
F. H. W. Fraentzel

INVENTOR:
Frank J. Hall,
BY
Fred C. Fraentzel.
ATTORNEY

No. 796,638. PATENTED AUG. 8, 1905.
F. J. HALL.
MOLDING DEVICE.
APPLICATION FILED JAN. 20, 1905.

UNITED STATES PATENT OFFICE.

FRANK J. HALL, OF JERSEY CITY, NEW JERSEY.

MOLDING DEVICE.

No. 796,638.      Specification of Letters Patent.      Patented Aug. 8, 1905.

Application filed January 20, 1905. Serial No. 241,938.

*To all whom it may concern:*

Be it known that I, FRANK J. HALL, a citizen of the United States, residing at Jersey City, in the county of Hudson and State of New Jersey, have invented certain new and useful Improvements in Molding Devices; and I do hereby declare the following to be a full, clear, and exact description of the invention, such as will enable others skilled in the art to which it appertains to make and use the same, reference being had to the accompanying drawings, and to the numerals of reference marked thereon, which form a part of this specification.

This invention has reference to improvements generally in molding devices or apparatus; and the invention relates more particularly to a novel device or mechanism to be used for the purpose of molding or forming plastic and other suitable material into bricks, blocks, slabs, or the like, and especially for the making of concrete blocks or bricks from a mixture of cement and sand.

The invention has for one of its principal objects the production of a simple, cheap, and efficient molding device which can be easily manipulated and by means of which bricks, blocks, or slabs and the like can be quickly made with a great saving in time and labor and at a greatly-reduced expense.

A further object of this invention is to provide a molding device of the general character hereinafter set forth, which comprises a base and a molding board or pallet and a molding-frame the sides of which are collapsible and which may also be provided with movable and self-adjustable mold partitions or partition-sections, all capable of being arranged in the form of a mold provided with a forming compartment or compartments in which the material to be formed into shape is molded and having its sides, ends, and mold-partitions separately connected so as to be removable from the pallet and from the sides and ends of the formed brick or block thereon, substantially as will be hereinafter more fully set forth.

A further object of this invention is to provide a brick or other mold in which the partition-sections forming the molding-compartments are capable of being separated and moved away longitudinally and laterally from the ends and sides of the molded brick or bricks.

Other objects of this invention not at this time more particularly mentioned will be clearly evident from the following detailed description of my present invention.

The invention consists, primarily, in the novel molding device or apparatus hereinafter set forth; and, furthermore, this invention consists in the various arrangements and combinations of the devices and parts, as well as in the details of the construction of the same, all of which will be more fully described in the following specification and then finally embodied in the clauses of the claim, which are appended to and which form an essential part of this specification.

The invention is clearly illustrated in the accompanying drawings, in which—

Similar characters of reference are employed in the above-described views to indicate corresponding parts.

Figure 1:
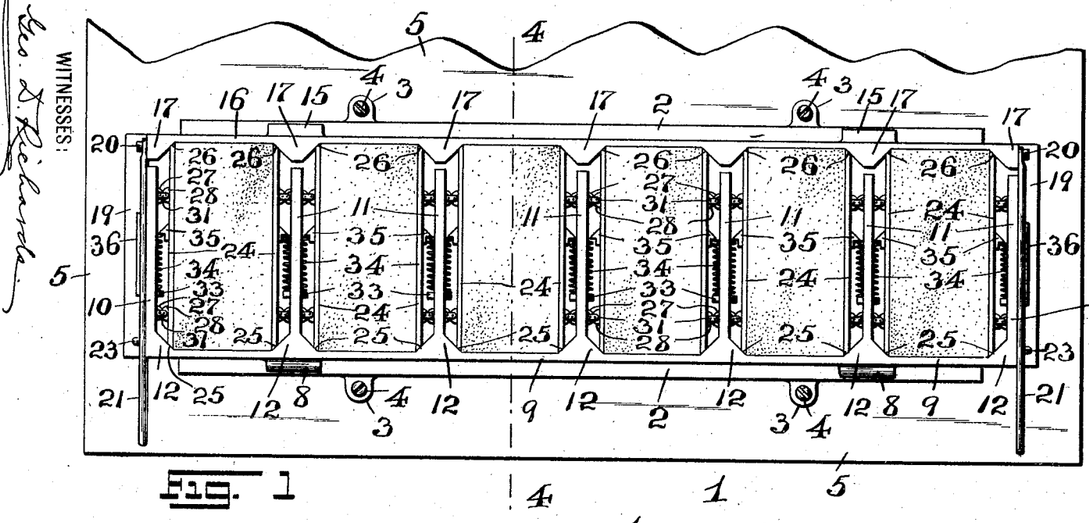
Figure 1 is a top or plan view of a molding device or apparatus made according to the principles of my present invention, showing the material formed into bricks in the assembled parts of the molding device.
Figure 2:
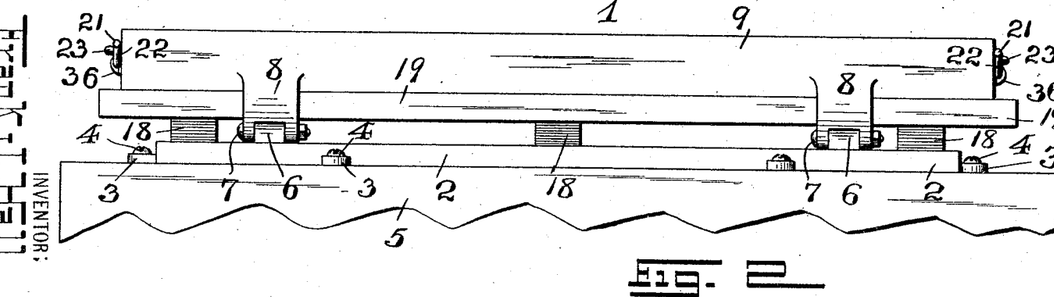
Fig. 2 is a front elevation of the same.
Figure 3:
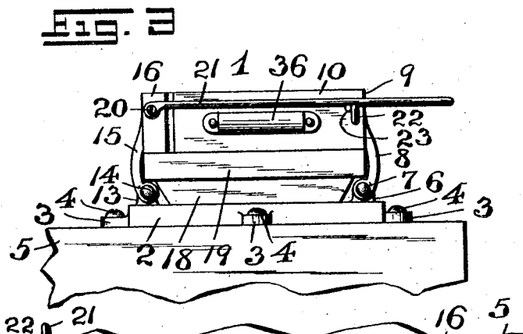
Fig. 3 is an end view of the molding device.
Figure 4:
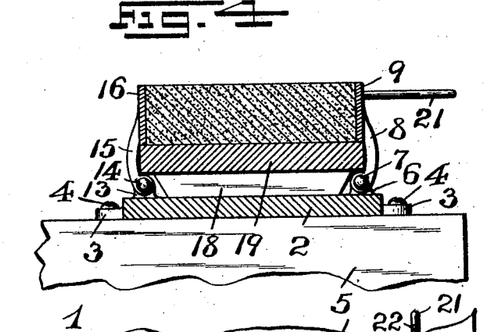
Fig. 4 is a transverse vertical section of the same, taken on line 4 4 in said Fig. 1.
Figure 5:
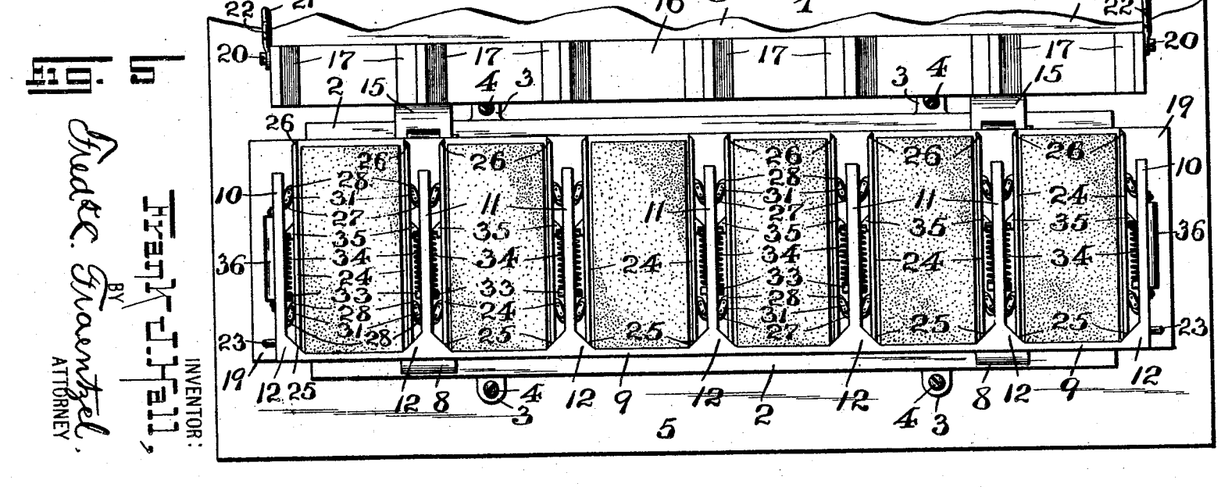
Fig. 5 is a plan view of the said molding device with one of the longitudinal sides of the mold thrown back and the partition members and partition-sections moved away from the molded or formed blocks or bricks.
Figure 6:
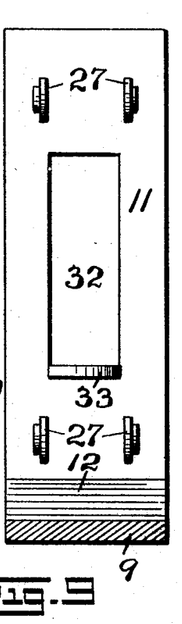
Fig. 6 is a transverse vertical section of the molding device, showing the several sides of the device removed from the sides and ends of the molded blocks or bricks.
Figures 7, 8, 9:
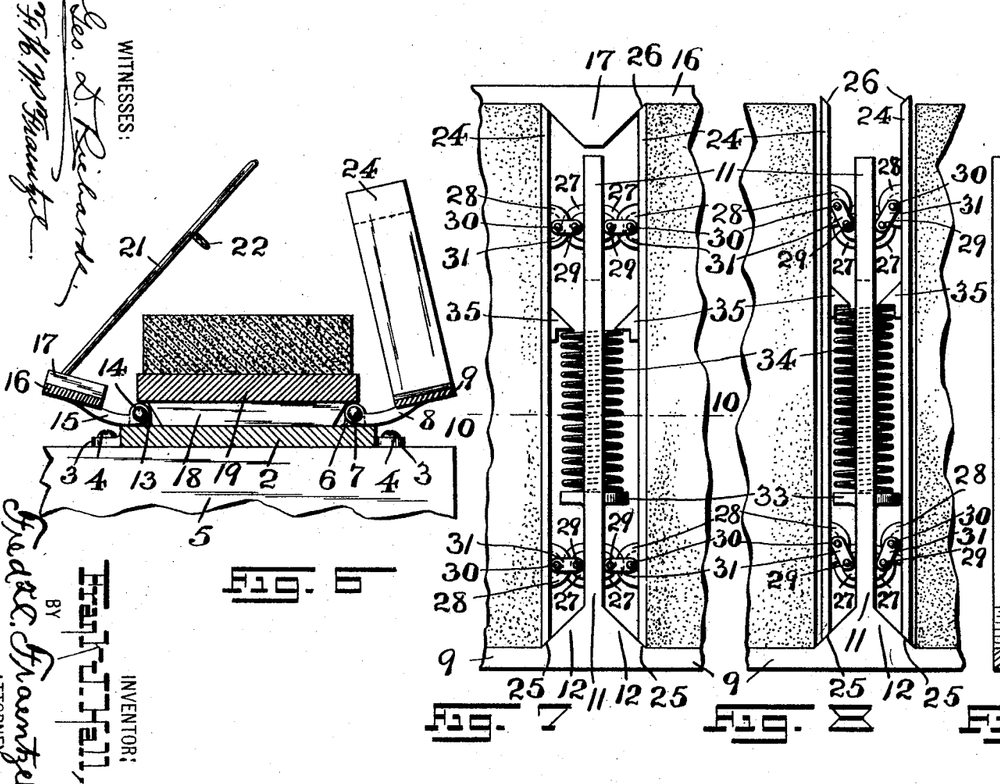
Fig. 7 is a detail plan or top view of one of the mold partitions and a pair of spring-actuated movable and self-adjustable sections or boards connected therewith, the same being shown with their end portions in contact with the inner faces of the respective longitudinal sides of the molding device and with the faces of the two movable and self-adjusting partition-sections against the sides of the molded bricks, portions of the latter being shown in plan.
Fig. 8 is a similar view with the rear longitudinal side of the molding device removed and the said two spring-actuated and movable partition-sections moved away from their engagement with the sides of the formed bricks.
Fig. 9 is a transverse sectional representation of the front longitudinal side of the molding device and one of its partition members, the latter being shown in side elevation.

Referring now to the said drawings, the reference character 1 indicates the complete molding device or apparatus, of which the character 2 indicates a suitable base, which is provided with any suitable fastening means, preferably perforated ears or lugs 3 and screws 4 for securing the same upon the upper face of a bench, table, or other support 5. The said base 2 is provided at or near its front edge with two or more upwardly-extending lugs or ears 6 for the reception of suitable pintles or bolts 7. Pivotally connected with the said pintle-receiving ears or lugs 6 by means of the said pintles or bolts 7 are suitable hinge members 8, with which is connected the front longitudinally-extending side or face 9 of the molding-frame. Extending rearwardly from the said front side or face 9 are end pieces or members 10 and a series of intermediate partitions or walls 11. At the points where the said end pieces or members 10 and the intermediate partitions or walls 11 are connected with the inner face of the front side or face 9 they are joined by the angularly-inclined or wedge-shaped members or portions 12 substantially in the manner illustrated in the several figures of the drawings. The base 2 is also provided at or near its rear edge with two or more upwardly-extending and perforated ears or lugs 13, in which are arranged pintles or bolts 14. Pivotally connected with the said pintles or bolts 14 are suitable hinge members 15 of the rear longitudinally-extending side or back 16 of the molding-frame. This said side or back 16 is provided upon its inner face with suitably-disposed angularly-inclined or wedge-shaped members or portions 17, as shown, corresponding in position and number to the ends 10 and the partitions of the front side 9 and being in alinement with the said respective ends and partitions 11, as shown. When the said collapsible sides 9 and 16 and the ends 10 and partitions 11 are to be brought into their relatively operative positions above the base-plate 2, so as to form a complete molding-frame, substantially as shown in in Figs. 1, 2, 3, and 4 and for the purposes to be hereinafter more fully specified, suitable blocks or wedges 18 may be arranged upon the upper face of the said base-plate, and upon these blocks I place a molding board or pallet 19 of approximately the length and width shown in the said figures of the drawings. This having been accomplished, the two sides 9 and 16 are closed down directly upon the said board or pallet 19, as shown in said Figs. 3 and 4. Pivotally connected with one or both ends of the said rear longitudinal side 16 by means of pins or screws 20 or other suitable means are suitably-constructed rods or levers 21, each of which is provided with a holding or locking member, as 22, adapted to be forced into holding engagement with a projection, post, or pin 23, extending from the side of one or both end pieces or members 10 of the front side 9 for holding or retaining the several parts in their relatively locked and operative positions upon the molding board or pallet 19, and thereby providing a complete molding-frame. To produce the several forming or molding compartments in which the plastic material is to be formed or molded into bricks, blocks, slabs, or the like of the proper size and shape, I have arranged upon the opposite sides or faces of each partition 11 and upon the inner surface of each end piece 10 movable and self-adjusting partition sections or boards 24, preferably formed with the angular or chamfered marginal edges 25 and 26, adapted to fit upon the inclined surfaces of said wedge-shaped portions or members 12 and 17 of the respective sides 9 and 16 and directly at the juncture of each inclined side with the inner flat face of the said sides 9 and 16, as shown more particularly in Figs. 1, 7, 12, 13, and 14. In the construction represented in Figs. 1, 5, 7, 8, and 10 of the drawings the inner faces of the ends 10 and the opposite sides of the intermediate walls or partitions 11 are provided with suitably-disposed ears or lugs 27, and the said movable partition sections or boards 24 are likewise provided with correspondingly-disposed ears or lugs 28, said ears or lugs 27 carrying pivots 29, the ears or lugs 28 carrying pivots 30, and 31 indicating suitable links whereby the said partition-sections 24 are movably connected with the said partitions 11 and with the end pieces 10, as will be clearly understood. Each end piece 10 and each partition 11 is also provided with an opening 32 and the laterally-extending projections 33 at the one end of said opening 32, and arranged in the said opening with its one end against the said projections 33 is a coiled spring 34, and 35 represents suitably-disposed projections or stops extending from the sides of the movable partition sections or boards 24, against which the other ends of the said coiled springs 34 extend and are in operative engagement therewith. Thus it will be clearly seen that when the sides 9 and 16 are brought into their operative positions upon the pallet 19, as shown in Figs. 1, 2, and 3, the said partition sections or boards 24 will have their chamfered edges 25 and 26 automatically forced into engagement with the inner faces of the respective sides 9 and 16, the coils of the said springs 34 being compressed with the parts of the pivotal connections in the relative positions shown in Fig. 7 of the drawings. The parts are then retained in their locked relation by forcing the holding or locking member 22 of each rod or lever 21 over a projection, post, or pin 23, as shown. In this manner a number of molding or forming compartments are provided in which the plastic material can be formed in the usual manner into bricks, blocks, slabs, or the like. To remove the pallet 19, with the finished molded forms thereon, from the molding device or frame thus produced the levers or arms 21 are raised from their holding engagement with the said pins, projections, or posts 23, and the hinged rear side 16, by means of said levers or arms 21, is thrown back into the position indicated in Figs. 5 and 6, thereby removing the said side 16 away from the ends of the molded bricks or blocks. At the same time the compressed coils of the several springs 34 tend to assume their normal initial positions, and thereby force the movable partition sections or boards 24 away from the longitudinal sides of the molded blocks or bricks, as clearly indicated in Fig. 8 of the drawings. Then by means of handles 36 upon the end pieces 10 the front side 9 is moved away from the molded bricks or blocks into the position indicated in Fig. 6 of the drawings, its end pieces 10, partitions 11, partition-sections 24, and the actuating mechanism connected therewith being simultaneously moved with the said side 9 away from the molded bricks or blocks. The pallet 19 and the bricks or blocks thereon can now be easily removed, as will be clearly evident from an inspection of said Fig. 6 of the drawings, and the parts of the device are then again ready to be brought into position for the next molding or forming operation.

Figures 10, 11, 12:
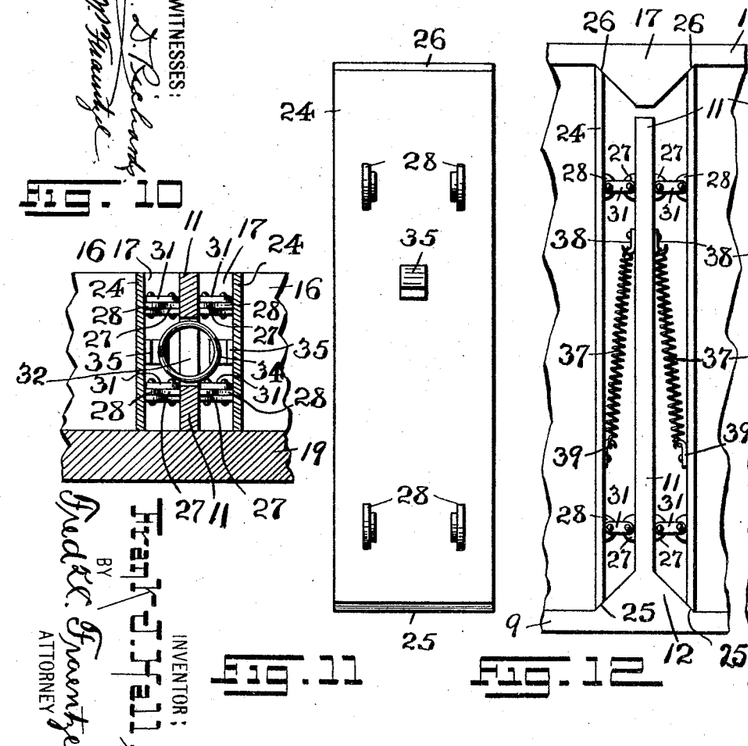
Fig. 10 is a transverse vertical section taken on line 10 10 in said Fig. 7.
Fig. 11 is a side view of one of the said movable and spring-actuated partition-sections.
Figs. 12, 13, and 14 are plan views of modified arrangements of the parts represented in said Fig. 7.
Figures 13, 14:
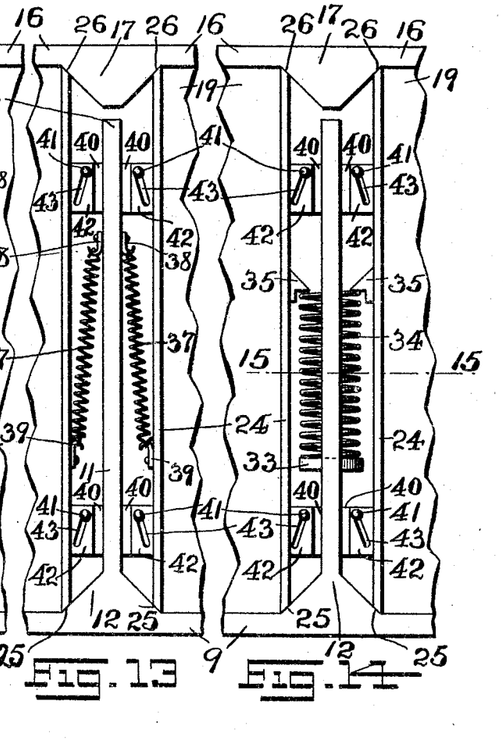
Figure 15:
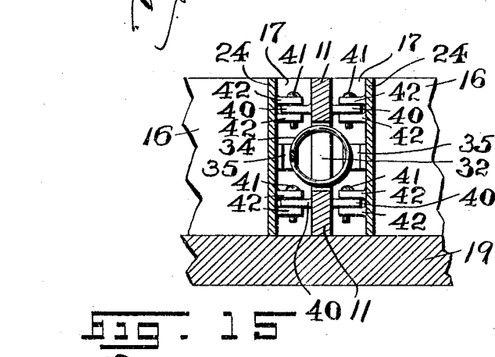
Fig. 15 is a transverse vertical section taken on line 15 15 in said Fig. 14.

In lieu of the coiled springs 24, shown in connection with the end pieces 10 and partitions 11 and with the movable and self-adjusting partition-sections 24, springs 37 may be used, as shown in Figs. 12 and 13 of the drawings, the said springs having their respective ends attached to hooks 38 and 39 or other suitable fastening means upon the respective parts, substantially as shown. The pivotal connection between the said parts may be the same as that shown in Figs. 7 and 8 of the drawings; but it will be evident that with either arrangement of springs 37 or 34 sliding connections may be used between the parts in the manner indicated in Figs. 13 and 14 of the drawings. These sliding connections consist, essentially, of extensions 40, projecting from the sides of the end pieces 10 and the partitions 11, said extensions being provided with studs or posts 41, which project into angularly-arranged slots or openings 43 of suitable slides or plates 42, secured upon the sides of the partition sections or boards 24, as shown in said Figs. 13 and 14 and from an inspection of which the operations of the said parts will be clearly evident.

Figure 16:
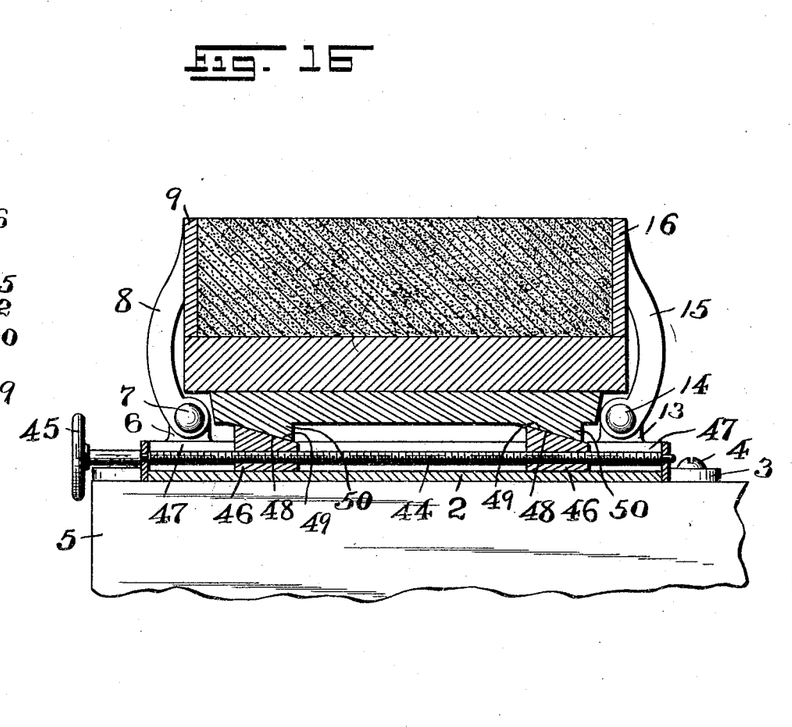
Fig. 16 is a transverse vertical section, on an enlarged scale, of a modified construction of molding device embodying the principles of my present invention and showing in connection therewith means for tightly forcing the pallet against the under edges of the collapsible sides and other portions of the molding device.

In Fig. 16 of the drawings I have shown a means for tightly forcing the pallet 19 against the lower edges of the sides 9 and 16 and other parts of the molding device when the said sides and parts have been brought into their operative positions upon the said pallet. This tightening means consists, essentially, of a screw or screws 44, each being provided with a hand-wheel 45 or other actuating device and one or more nuts 46 upon the threaded portion of the screw or screws 44. The said screw or screws 44 and its nut or nuts 46 are arranged in a groove or grooves 47 in the base-plate 2, substantially as shown in said Fig. 16, and each nut 46 is made with a tapering face or surface 48, which when the screw is turned is brought against a tapering face 50 of a projection or projections 49, formed upon the under face of the block or blocks 18. The said blocks may be provided with any suitable number of such projections 49, the nuts 46 and screws 44 being made to correspond. The operations of the parts for tightly forcing the pallet 19 against the lower edges of the sides 9 and 16 and the other parts will be clearly understood from an inspection of said Fig. 16.

From the foregoing description of my invention it will be clearly seen that I have devised a simply-constructed and efficiently-working molding device or apparatus in which bricks and other bodies can be rapidly formed in large quantities and without any danger of marring the sides or edges of the molded bodies while in their green state, because of the fact that the sides of the molding or forming members are collapsible and move away from the sides of the finished body.

I am aware that changes may be made in the arrangements and combinations of the devices and parts, as well as in the details of the construction of the parts thereof, without departing from the scope of my present invention. Hence I do not limit my invention to the exact arrangements and combinations of the devices and parts as described in the foregoing specification and as illustrated in the accompanying drawings, nor do I confine myself to the exact details of the construction of the said parts.

Having thus described my invention, what I claim is—

1. In a molding device, the combination, with a base-plate, of a molding-frame upon said base-plate, said frame comprising longitudinal front and rear sides both of which are hinged to said base-plate, and said front side having end pieces rigidly connected therewith and forming the ends of the said molding-frame, substantially as and for the purposes set forth.

2. In a molding device, the combination, with a base-plate, of a molding-frame upon said base-plate, said frame comprising longitudinal front and rear sides hinged to said base-plate, and said front side having end pieces forming the ends of the said molding-frame, and a holding means connected with the rear side and said end pieces for retaining the parts in their operative positions for molding purposes, substantially as and for the purposes set forth.

3. In a molding device, the combination, with a base-plate, of a molding-frame upon said base-plate, said frame comprising longitudinal front and rear sides hinged to said base-plate, and said front side having end pieces forming the ends of the said molding-frame, locking or holding levers pivotally connected with said rear side, a lug on each end piece, and a holding projection upon each lever for engagement with a lug for retaining the parts in their operative positions for molding purposes, substantially as and for the purposes set forth.

4. In a molding device, the combination, with a base-plate, of a molding-frame upon said base-plate, said frame comprising collapsible sides, and partitions extending from the inner face of one of said sides, substantially as and for the purposes set forth.

5. In a molding device, the combination, with a base-plate, of a molding-frame upon said base-plate, said frame comprising collapsible sides, partitions extending from the inner face of one of said sides, and a holding means connected with said sides for retaining them in their operative positions for molding purposes, substantially as and for the purposes set forth.

6. In a molding device, the combination, with a base-plate, of a molding-frame upon said base-plate, said frame comprising longitudinal front and rear sides hinged to said base-plate, said front side having laterally-extending end pieces and intermediate partitions extending from the inner face of said side, substantially as and for the purposes set forth.

7. In a molding device, the combination, with a base-plate, of a molding-frame upon said base-plate, said frame comprising longitudinal front and rear sides hinged to said base-plate, said front side having laterally-extending end pieces and intermediate partitions extending from the inner face of said side, and a holding means connected with the rear side and said end pieces for retaining the parts in their operative positions for molding purposes, substantially as and for the purposes set forth.

8. In a molding device, the combination, with a base-plate, of a molding-frame upon said base-plate, said frame comprising longitudinal front and rear sides hinged to said base-plate, said front side having laterally-extending end pieces and intermediate partitions extending from the inner face of said side, locking or holding levers pivotally connected with the said rear side, a lug on each end piece, and a holding projection upon each lever for engagement with a lug for retaining the parts in their operative positions for molding purposes, substantially as and for the purposes set forth.

9. In a molding device, the combination, with a base-plate, of a molding-frame upon said base-plate, said frame comprising collapsible sides, partitions extending from the inner face of one of said sides, and movable and self-adjusting partition-sections on opposite sides of said partitions, substantially as and for the purposes set forth.

10. In a molding device, the combination, with a base-plate, of a molding-frame upon said base-plate, said frame comprising collapsible sides, partitions extending from the inner face of one of said sides, movable and self-adjusting partition-sections on opposite sides of said partitions, and a holding means connected with said sides for retaining them in their operative positions for molding purposes, substantially as and for the purposes set forth.

11. In a molding device, the combination, with a base-plate, of a molding-frame upon said base-plate, said frame comprising longitudinal front and rear sides hinged to said base-plate, said front side having laterally-extending end pieces and intermediate partitions extending from the inner face of said side, and movable and self-adjusting partition-sections upon the inner sides of said end pieces and on opposite sides of said partitions, substantially as and for the purposes set forth.

12. In a molding device, the combination, with a base-plate, of a molding-frame upon said base-plate, said frame comprising longitudinal front and rear sides hinged to said base-plate, said front side having laterally-extending end pieces and intermediate partitions extending from the inner face of said side, movable and self-adjusting partition-sections upon the inner sides of said end pieces and on opposite sides of said partitions, and a holding means connected with the rear side and said end pieces for retaining the parts in their operative positions for molding purposes, substantially as and for the purposes set forth.

13. In a molding device, the combination, with a base-plate, of a molding-frame upon said base-plate, said frame comprising longitudinal front and rear sides hinged to said base-plate, said front side having laterally-extending end pieces and intermediate partitions extending from the inner face of said side, movable and self-adjusting partition-sections upon the inner sides of said end pieces and on opposite sides of said partitions, locking or holding levers pivotally connected with the said rear side, a lug on each end piece, and a holding projection upon each lever for engagement with a lug for retaining the parts in their operative positions for molding purposes, substantially as and for the purposes set forth.

14. In a molding device, the combination, with a base-plate, of a molding-frame upon said base-plate, said frame comprising collapsible sides, partitions extending from the inner face of one of said sides, each partition being provided with an opening, movable partition-sections on opposite sides of said partitions, means of pivotal connection between said partitions and partition-sections, lugs on said partition-sections, and a spring in the opening of each partition and in engagement with the lugs of the partition-sections, substantially as and for the purposes set forth.

15. In a molding device, the combination, with a base-plate, of a molding-frame upon said base-plate, said frame comprising collapsible sides, partitions extending from the inner face of one of said sides, each partition being provided with an opening, movable partition-sections on opposite sides of said partitions, means of pivotal connection between said partitions and partition-sections, lugs on said partition-sections, a spring in the opening of each partition and in engagement with the lugs of the partition-sections, and a holding means connected with said sides for retaining them in their operative positions for molding purposes, substantially as and for the purposes set forth.

16. In a molding device, the combination, with a base-plate, of a molding-frame upon said base-plate, said frame comprising longitudinal front and rear sides hinged to said base-plate, said front side having laterally-extending end pieces and intermediate partitions extending from the inner face of said front side, each end piece and each partition being provided with an opening, movable partition-sections upon the inner sides of said end pieces and on opposite sides of said partitions, means of pivotal connection between the said end pieces, the said partitions, and the various partition-sections, springs in the openings of said end pieces and said partitions, and lugs upon the said partition-sections with which the said springs are in engagement, substantially as and for the purposes set forth.

17. In a molding device, the combination, with a base-plate, of a molding-frame upon said base-plate, said frame comprising longitudinal front and rear sides hinged to said base-plate, said front side having laterally-extending end pieces and intermediate partitions extending from the inner face of said front side, each end piece and each partition being provided with an opening, movable partition-sections upon the inner sides of said end pieces and on opposite sides of said partitions, means of pivotal connection between the said end pieces, the said partitions, and the various partition-sections, springs in the openings of said end pieces and said partitions, lugs upon said partition-sections with which the said springs are in engagement, and a holding means connected with the rear side and said end pieces for retaining the parts in their operative positions for molding purposes, substantially as and for the purposes set forth.

18. In a molding device, the combination, with a base-plate, of a molding-frame upon said base-plate, said frame comprising longitudinal front and rear sides hinged to said base-plate, said front side having laterally-extending end pieces and intermediate partitions extending from the inner face of said front side, each end piece and each partition being provided with an opening, movable partition-sections upon the inner sides of said end pieces and on opposite sides of said partitions, means of pivotal connection between the said end pieces, the said partitions, and the various partition-sections, springs in the openings of said end pieces and said partitions, lugs upon said partition-sections with which the said springs are in engagement, locking or holding levers pivotally connected with the said rear side, a lug on each end piece, and a holding projection upon each lever for engagement with a lug for retaining the parts in their operative positions for molding purposes, substantially as and for the purposes set forth.

19. In a molding device, the combination, with a front side 9 and a rear side 16, said sides being provided with wedge-shaped portions 12 and 17 respectively, end pieces 10 and partitions 11 extending laterally from the said wedge-shaped portions 12, and partition-sections movably connected with the inner surfaces of said end pieces 10 and the opposite sides of said partitions 11, said partition-sections having chamfered edges 25 and 26 adapted to be brought in engagement with the inclined faces of said portions 12 and 17, respectively, substantially as and for the purposes set forth.

20. In a molding device, the combination, with a front side 9 and a rear side 16, said sides being provided with wedge-shaped portions 12 and 17, respectively, end pieces 10 and partitions 11 extending laterally from the said wedge-shaped portions 12, and partition-sections movably connected with the inner surfaces of said end pieces 10 and on opposite sides of said partitions 11, said partition-sections having chamfered edges 25 and 26 adapted to be brought in engagement with the inclined faces of said portions 12 and 17, respectively, the said end pieces 10 and said partitions 11 being provided with openings, springs in the openings of said end pieces and said partitions, and lugs upon the said partition-sections with which the said springs are in engagement, substantially as and for the purposes set forth.

21. In a molding device, the combination, with a base-plate and a pallet, of a molding-frame having collapsible sides adapted to be arranged in operative positions upon the pallet, and means for forcing the pallet against the under edges of the sides of the molding-frame, substantially as and for the purposes set forth.

22. In a molding device, the combination, with a base-plate and a pallet, of a molding-frame having collapsible sides adapted to be arranged in operative positions upon the pallet, and means for forcing the pallet against the under edges of the sides of the molding-frame, consisting of a screw, a wedge-shaped nut movable upon said screw, and a wedge-shaped device beneath said pallet against which said wedge-shaped nut can be moved, substantially as and for the purposes set forth.

23. In a molding device, the combination, with a base-plate and a pallet, of a molding-frame having longitudinal front and rear sides hinged to said base-plate, said front side having laterally-extending end pieces and intermediate partitions extending from the inner face of said side, movable and self-adjusting partition-sections upon the inner sides of the end pieces and on opposite sides of said partitions, and means for forcing the pallet against the under edges of the said sides, end pieces, and partitions, substantially as and for the purposes set forth.

24. In a molding device, the combination, with a base-plate and a pallet, of a molding-frame having longitudinal front and rear sides hinged to said base-plate, said front side having laterally-extending end pieces and intermediate partitions extending from the inner face of said side, movable and self-adjusting partition-sections upon the inner sides of the end pieces and on opposite sides of said partitions, and means for forcing the pallet against the under edges of the said sides, end pieces, and partitions, consisting of a screw, a wedge-shaped nut movable upon said screw, and a wedge-shaped device beneath said pallet against which said wedge-shaped nut can be moved, substantially as and for the purposes set forth.

In testimony that I claim the invention set forth above I have hereunto set my hand this 18th day of January, 1905.

FRANK J. HALL.

Witnesses:
    FREDK. C. FRAENTZEL,
    GEO. D. RICHARDS.